Jan. 20, 1970  ICHIRO WADA  3,490,282
INDUCTION LIQUID FLOWMETERS
Filed July 25, 1967  2 Sheets-Sheet 1
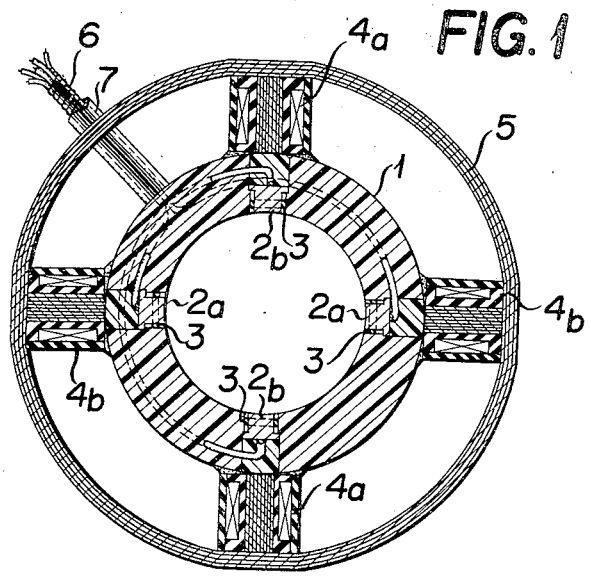
FIG. 1
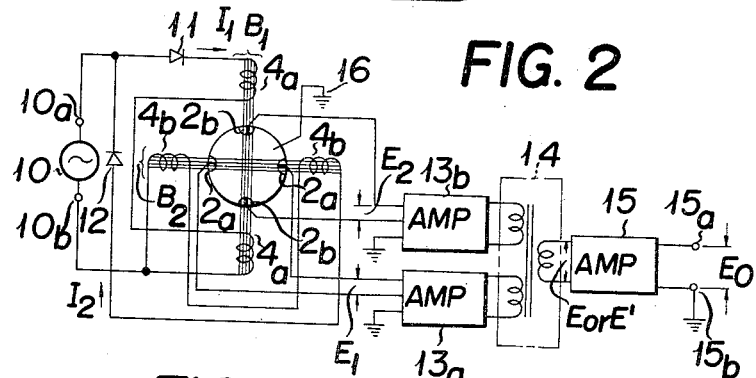
FIG. 2
FIG. 3A  FIG. 3D
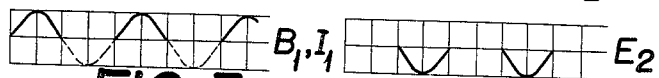
$B_1, I_1$   $E_2$
FIG. 3B  FIG. 3E
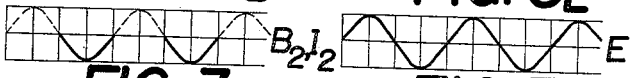
$B_2, I_2$   $E$
FIG. 3C  FIG. 3F
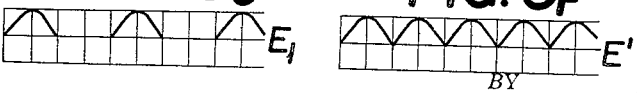
$E_1$   $E'$
INVENTOR.
Ichiro WADA
BY Stephen H. Frishauf
Aty

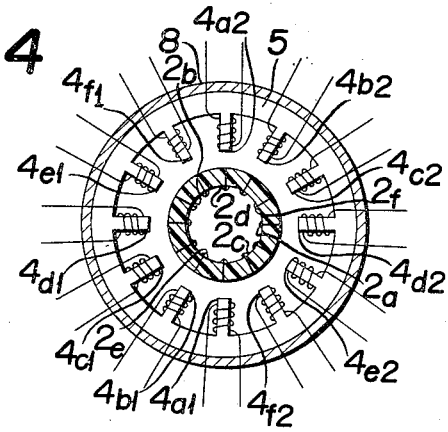
FIG. 4
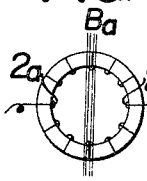
FIG. 5A
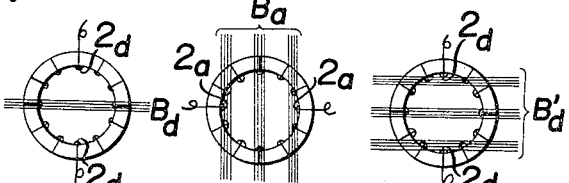
FIG. 6A
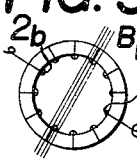
FIG. 5B
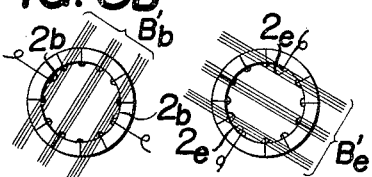
FIG. 5D FIG. 6B FIG. 6D
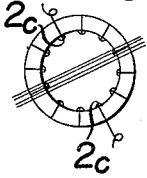
FIG. 5C
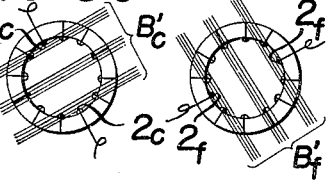
FIG. 5E FIG. 6C FIG. 6E
FIG. 5F
FIG. 6F

United States Patent Office

3,490,282
Patented Jan. 20, 1970

3,490,282
INDUCTION LIQUID FLOWMETERS
Ichiro Wada, Yokohama-shi, Japan, assignor to Tokyo Shibaura Electric Co., Ltd., Kawasaki-shi, Japan, a corporation of Japan
Filed July 25, 1967, Ser. No. 655,788
Claims priority, application Japan, July 28, 1966, 41/49,061
Int. Cl. G01p 5/08
U.S. Cl. 73—194                                 4 Claims

ABSTRACT OF THE DISCLOSURE

An induction liquid flowmeter wherein at least each pair of a plurality of pairs of diametrically opposed coils disposed at the outer circumference of a liquid-passing pipe with equal spacings are successively energized to produce within a body of the moving liquid, a beam-like magnetic field lying in a direction which varies with time. The output voltage which corresponds to the amount of liquid flow, is derived from a corresponding pair of diametrically opposed electrodes whose common axis is perpendicular to the direction of the magnet field and to the longitudinal axis of the pipe.

BACKGROUND OF THE INVENTION

This invention relates to liquid flowmeters for electrically measuring the flow of an electrically conductive liquid by the inductions of voltages therein.

In a signal generator used in a conventional induction liquid flowmeter, a pair of electrodes having a common axis are disposed in a pipe or tube through which a liquid flows, so that they contact the liquid. An induced voltage proportional to the product of the velocity of the liquid and the intensity of an alternating magnetic field is derived from the pair of electrodes, from the field acting in a direction perpendicular both to the common axis of the pair of electrodes and the direction of flow of the liquid. In such a generator, it would be possible to obtain accurate measurement of liquid flow by causing a magnetic field to merely alternate in a direction perpendicular to the common axis of the pair of electrodes, if the velocity of the flowing liquid were always equal throughout the entire cross sectional area of the flow pipe. However, the flow velocity is not always equal at every portion in the pipe. For instance, where the signal generator of the meter is to be installed at a position close to a curved, or otherwise non-linear section of pipe the flow velocity is higher at one side of the pipe and slower at the other due to centrifugal force, thus producing a so-called drift, which will result in erroneous readings unless the magnetic flux density is uniform within the flow pipe. In a flowmeter having the conventional generator or detector, the magnetic field is strongest on a diametrical line which perpendicularly intersects the common axis of the pair of electrodes, and becomes weaker away from said diametrical line. With such a flowmeter, the induced voltage obtained where fastest portion of the liquid flow passes through the strongest magnetic field region is higher than that obtained where the fastest portion of the flow passes, due to the drift, through a weak magnetic field portion, if the mean rate of liquid flow is the same in both instances.

In order to eliminate the foregoing drawbacks encountered in the prior art arrangement and to attain more accurate measurement, it is necessary that the intensity of the magnetic field intersecting the common axis of the pair of electrodes is uniform at such every intersecting portion. For producing a uniform magnetic field, a generator of the so-called cosine distribution winding is known wherein the winding distribution having an angle $\alpha$ from a pair of electrodes is changed to that having an angle cosine $\alpha$. The term generator used herein includes various elements so long as they cooperate to generate the signal proportional to the rate of flow. However, manufacture of the exciting windings of the cosine distribution winding is extremely difficult, and the placement of such windings on the surface of the pipe is not simple, so that a system modified from the cosine distribution system is generally employed. Thus, technical problems that still remain are: obtaining a uniform magnetic flux distribution of the alternating field; and solution of errors due to the drift of the liquid.

SUMMARY OF THE INVENTION

According to this invention, a plurality of pairs of coils and a corresponding number of pairs of electrodes are provided, respectively, on the outer and inner circumferential surfaces of a pipe through which liquid may flow, at positions having an equal angle with respect to the longitudinal axis of said pipe. The common axis of each pair of electrodes is perpendicular to the longitudinal axis of the pipe and to the common axis of a corresponding pair of coils. At least one of the pairs of coils are successively energized one after another thereby to generate a beam-like magnetic field whose direction changes with time. The output voltages are successively derived from the corresponding pair of electrodes whose common axis perpendicularly intersects the magnetic field. The average and additional values and the like of the outputs are calculated and converted into an output corresponding to the quantity of liquid flow by a converter.

Therefore, it is not necessary that the magnetic flux density distribution of the magnetic field generated by each of said pairs of coils be uniform. The reason is that due to irregular flow velocity, part of the liquid passing through the cross sectional portion of the pipe at which the detector means is set can be compensated by a magnetic flux lying in a successively changing direction. The correlation between the density distribution of the magnetic flux and the non-uniform flow velocity of the liquid is subject to plural combinations with the result that the difference in outputs in each combination is averaged, so that the undesirable influence caused by the non-uniformity of the magnetic field can be greatly reduced, when compared with the arrangement wherein a pair of electrodes cooperate with a single direction magnetic field to derive outputs. With the present invention, liquid flow may be measured with accuracy that is comparable with that in the case of using a uniform magnetic field.

An object of the invention is to provide an induction liquid flowmeter capable of effecting measurement with high accuracy without regard the need of a costly magnetic field generator adapted to give a magnetic flux density distribution of high uniformity.

BRIEF DESCRIPTION OF THE DRAWINGS

FIG. 1 is a cross sectional view of a generator for an induction liquid flowmeter embodying this invention;

FIG. 2 is an electrical connection diagram of the generator as shown in FIG. 1 combined with a converter;

FIGS. 3A to 3F inclusive show graphs illustrating wave forms of electrical currents impressed upon coils, magnetic fields established, flow signal voltages, and voltages obtained by composing said flow signal voltages, all in the circuit of FIG. 2;

FIG. 4 is a cross sectional view of a modification of the generator; and

FIGS. 5A to 5F and FIGS. 6A to 6F inclusive show the direction of a magnetic flux and the arrangement of electrodes in various stages.

DESCRIPTION OF THE PREFERRED EMBODIMENTS

FIG. 1 shows a pipe 1 through which a liquid flows, made, for example, of paper impregnated with a thermosetting synthetic resin and shaped after application of heat treatment to a circular cross section. In the wall of the pipe 1 are disposed two pairs of opposing electrodes 2a and 2b. The electrodes are at equal angular spacings in a common plane perpendicular to the longitudinal axis of the pipe, and each pair of electrodes has a common axis aligned to intersect the longitudinal axis of the pipe, the common axis of each pair of electrodes being perpendicular to that of the other. These electrodes are hermetically supported by O-rings 3. On the outer periphery of the pipe wall are disposed a pair of solenoid coils 4a of moisture proof construction which are coaxial with the common axis of the pair of electrodes 2b—2b and which are connected together in series. Similarly, a pair of solenoid coils 4b of similar construction are provided coaxially with the common axis of the electrodes 2a and connected together in series. A yoke 5 is provided in such a manner that ends of the solenoid coils 4a and 4b engage cores disposed on the inner surface of the yoke. Leads 6 connected to the electrodes are embedded in the pipe wall 1 and taken out through a hermetically sealed tube 7.

FIG. 2 shows a circuit diagram of the induction liquid flowmeter including the generator of FIG. 1 and a converter. Between the terminals 10a and 10b of a source 10 of AC voltage is connected a series circuit comprising a rectifier 11 and the pair of coils 4a. Between the junction 17 of the coils 4a with the terminal 10b of the AC power source 10, and the junction 18 of the rectifier 11 and the other terminal 10a of the AC power source 10, is connected a series circuit comprising the pair of coils 4b and a rectifier 12. The pair of electrodes 2a, which are located to be perpendicular to a magnetic field established by the coils 4a, are connected to an amplifier 13a, and the other pair of electrodes 2b located perpendicular to a magnetic field generated by the coils 4b, are connected to an amplifier 13b. A transformer 14 is provided to combine the outputs of the amplifiers 13a and 13b. The secondary winding of said transformer is connected to an amplifier 15 of which output terminals 15a and 15b provide output signals proportional to the rate of liquid flow. The liquid is grounded, as shown at 16.

The overall function of the flowmeter of this invention will now be described with reference to FIGS. 3A to 3F inclusive. During positive half waves of the source voltage, the coils 4a generate a beam-like magnetic field, with a magnetic flux density of $B_1$, by the action of an electric current $I_1$ (see FIG. 3A) flowing in the direction of an arrow in FIG. 2. A liquid flow signal $E_1$ (see FIG. 3C) corresponding to said magnetic field will be obtained between the electrodes 2a. During negative half waves, a current $I_2$ (see FIG. 3B) flowing in the direction of the arrow in FIG. 2 will cause the coils 4b to generate a beam-like magnetic field with a magnetic flux density $B_2$, whereby a liquid flow signal $E_2$ (see FIG. 3D) corresponding to the magnetic field will be induced between the electrodes 2b. The signals $E_1$ and $E_2$ thus induced are combined by the transformer 14 to become a signal $E$ (see FIG. 3E) or a signal $E'$ (see FIG. 3F) of a polarity opposite to that of the signal $E_2$, and introduced into the amplifier 15 whose output will show a liquid flow signal $E_0$, which will then be read on an indicator not shown. The abscissa in FIGS. 3A through 3F indicate time, and the ordinates in FIGS. 3A and 3B show the currents and the magnetic flux density and those in FIGS. 3C to 3F show the voltage.

Thus, output signals produced in the alternating fields which perpendicularly intersect each other are combined to measure the amount or rate of liquid flow, so that undesirable influences upon measurement due to nonuniformity in the magnetic flux density distribution in each magnetic field and in the flow velocity distribution of the liquid can be greatly reduced, thus enabling the measurement of liquid flow with high accuracy. Furthermore, the structure of the magnetic field generator is simple. The width thereof, with respect to the longitudinal axis of the pipe 1, can be very short and no outer casing is necessary. Therefore, it is possible to produce an induction liquid flowmeter of high accuracy and of low cost.

FIGS. 4 to 6 illustrate a modification of the apparatus wherein a magnetic field lies in various directions with a time lag and the output voltages are derived successively from a plurality of pairs of electrodes. In FIG. 4, six pairs of electrodes 2a, 2b, 2c, 2d, 2e and 2f are disposed with equal spacings therebetween, on the inner wall of the flow pipe 1 through which liquid passes, so that the electrodes in each pair oppose each other in such a manner that the common axis thereof is perpendicular to the longitudinal axis of the pipe, and contact the moving liquid to pick up the output voltages induced. Around the pipe 1 is provided a ring-shaped yoke 5 having on its inner surface twelve radially and inwardly directed cores which are equally spaced to make six pairs, each pairs positioned in alignment with the common axis of a respective pair of electrodes. On the six pairs of projections are six pairs of coils $4a_1$–$4a_2$, $4b_1$–$4b_2$, $4c_1$–$4c_2$, $4d_1$–$4d_2$, $4e_1$–$4e_2$ and $4f_1$–$4f_2$ whose common axes are perpendicular to those of the pairs of electrodes 2a, 2b, 2c, 2d, 2e and 2f. A housing 8 is mounted about said yoke 5.

The generator for the induction liquid flowmeter further comprises means, not shown, for successively energizing said six pairs of coils and a converter (not shown) for combining the flow signals successively taken from the six pairs of electrodes and for converting them into an output corresponding to the rate of liquid flow.

In the induction liquid flowmeter of the arrangement described above, the pairs of coils are successively energized with a respective time lag to establish a beam-like magnetic flux which periodically moves or rotates, and outputs are successively obtained from the pair of electrodes whose common axis is perpendicular to the magnetic flux as shown in the following table.

Magnetic flux:
$$B_a \to B_b \to B_c \to B_d \to B_e \to B_f \to B_a \to \text{repeated}$$
Output (between electrodes):
$$2a \to 2b \to 2c \to 2d \to 2e \to 2f \to 2a \to \text{repeated}$$

The magnetic fluxes $B_a$ to $B_f$ in this instance lie in successively rotated positions in changing directions as shown in order of rotation in FIGS. 5A to 5F. In FIGS. 5A–5F, the pairs of coils are not illustrated as they are positioned in the manner shown in FIG. 4. The magnetic flux $B_a$ is formed by energizing the coils $4a_1$ and $4a_2$ and the magnetic fluxes $B_b$ to $B_f$ are obtained similarly through the energization of the successive pairs of coils.

It will be apparent that the measured value of the rate of liquid flow obtained in the above manner can be more accurate than that obtained in the case where the output signals are obtained using two pairs of electrodes by causing two pairs of coils, as shown in FIGS. 1 and 2, to alternately generate magnetic fields lying in two directions which perpendicularly intersect each other. This is because the drift of the liquid flow can be measured more accurately if the pipe is traversed by the magnetic flux in several different directions.

As shown in the following table, it is also possible to generate three parallel beam-like magnetic fluxes by simultaneously energizing three pairs of coils, by means of a parallel bias circuit and to obtain outputs successively from one pair of electrodes whose common axis is perpendicular to the said fluxes. The successive fluxes $B_a'$ to $B_f'$ are shown in FIGS. 6A to 6F and are tabulated below.

Magnetic flux:
$$B_a' \to B_b' \to B_c' \to B_d' \to B_e' \to B_f' \to B_a' \to \text{repeated}$$
Output (between electrodes):
$$2a \to 2b \to 2c \to 2d \to 2e \to 2f \to 2a \to \text{repeated}$$

The location of the pairs of coils to establish the magnetic fluxes $B_a'$ to $B_f'$ is the same as that shown in FIG. 4 and hence is omitted from FIGS. 6A–6F. The magnetic flux $B_a'$, for example, is obtained by energizing the coils $4a_1$–$4a_2$, $4b_1$–$4f_1$ and $4f_2$–$4b_2$ and the fluxes $B_b'$ to $B_f'$ in a similar manner.

It will be appreciated without further explanation that the resultant value of measurement of liquid flow greatly exceeds in accuracy that obtained from the single rotating magnetic flux as described previously.

As has been stated, non-uniformity in the flow velocities of a moving liquid can be compensated by a beam-like magnetic field or fields which change their direction with respect to time. A flow signal is derived successively from a pair or pairs of electrodes whose common axes are perpendicular to the magnetic field or fields and a converter provides an output signal corresponding to liquid flow. It is, therefore, not necessary to make the magnetic flux density distribution uniform. As the direction of the magnetic field is varied periodically, the correlation between the nonuniformity of the magnetic field and that of the flow velocity is changed, with the result that the flow meter of this invention greatly reduces or eliminates errors that may be caused due to the non-uniformity of the magnetic field. Thus the present meter is capable of measuring liquid flow with accuracy equivalent to that obtainable with a conventional meter using a single or fixed direction, uniform magnetic field.

What is claimed is:

1. An induction liquid flowmeter comprising:
    a pipe through which liquid flows;
    a plurality of pairs of electrodes arranged to contact the liquid flowing through the pipe to pick up voltages induced in the liquid, the electrodes of each pair being diametrically opposed along a common axis, the electrodes being disposed in a common plane perpendicular to the axis of the pipe;
    a plurality of pairs of coils arranged to generate at least one beam-like magnetic field parallel to said common plane of and perpendicular to said common axis of a corresponding pair of electrodes;
    a yoke disposed outside the pipe and having a plurality of cores on its inner surface and in engagement with respective coils;
    means for successively energizing respective pairs of coils to generate said beam-like magnetic field and established beam-like magnetic flux, the direction of which changes with time; and
    means combining signals successively derived from the corresponding pair of electrodes whose common axis is, at any instant, perpendicular to the beam-like flux to obtain an output proportional to the rate of flow of the liquid in said pipe.

2. The flowmeter of claim 1 having two pairs of electrodes whose common axes are mutually perpendicular and two pairs of coils, and wherein the energizing means comprises:
    a source of alternating current;
    a first rectifier arranged to transmit to one pair of coils the positive half-cycles of the alternating current; and
    a second rectifier arranged to transmit to the other pair of coils the negative half-cycles of the alternating current.

3. The flowmeter of claim 2 wherein said combining means includes a transformer arranged to combine the signals from the two pairs of electrodes.

4. The flowmeter of claim 3 wherein the transformer has two primary windings, each receiving signals from a respective pair of electrodes, and a secondary winding common to the two primary windings.

References Cited

UNITED STATES PATENTS

| | | | |
|---|---|---|---|
| 2,450,982 | 10/1948 | O'Brien | 310—166 XR |
| 2,722,122 | 11/1955 | Soffel | 73—194 |
| 2,896,451 | 7/1959 | Rinia | 73—194 |
| 3,372,589 | 3/1968 | Mannherz | 73—194 |

FOREIGN PATENTS

| | | |
|---|---|---|
| 980,127 | 1/1965 | Great Britain. |

CHARLES A. RUEHL, Primary Examiner